UNITED STATES PATENT OFFICE.

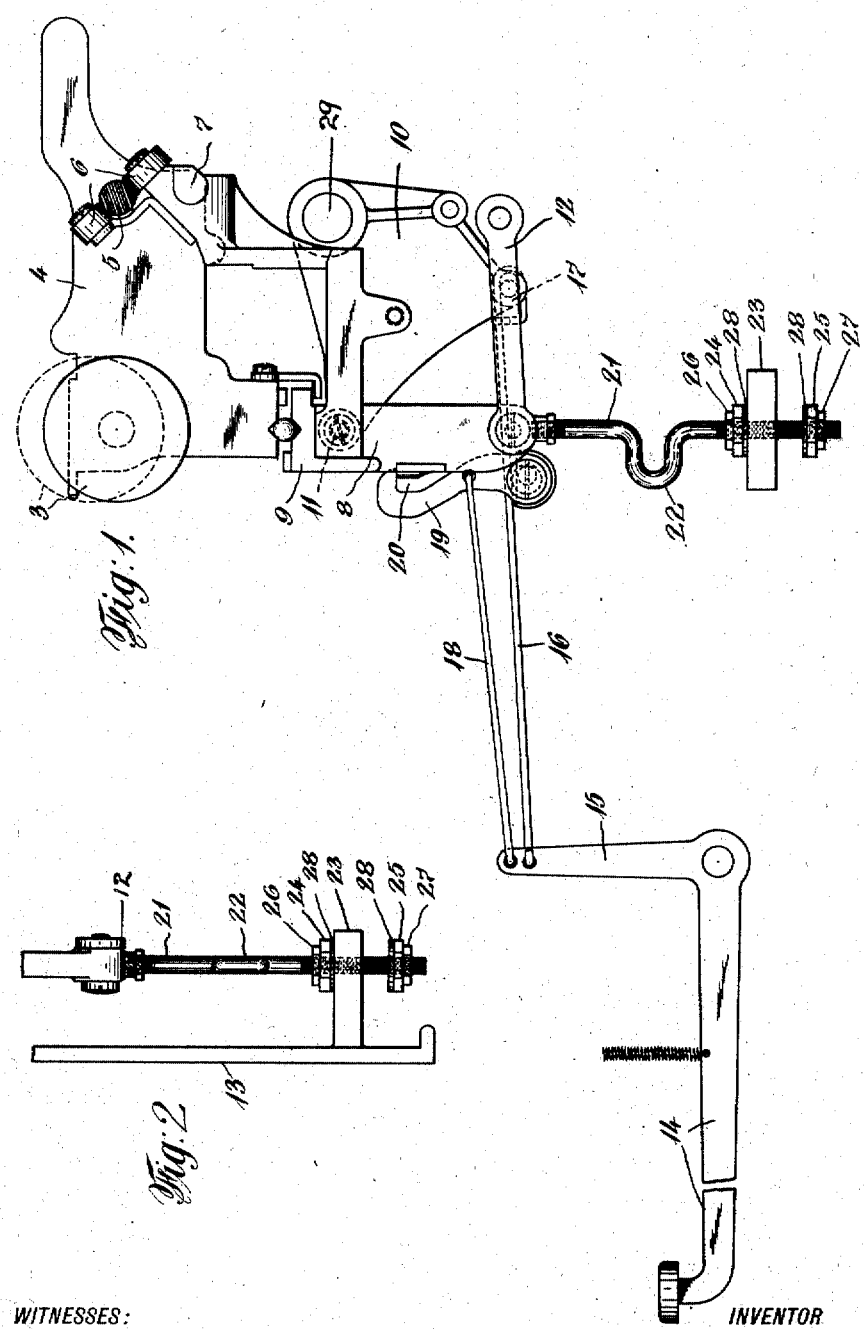

LEWIS C. MYERS, OF BROOKLYN, NEW YORK, ASSIGNOR TO ROYAL TYPEWRITER COMPANY, INC., OF NEW YORK, N. Y., A CORPORATION OF NEW YORK.

CARRIAGE-SHIFT STOP FOR TYPE-WRITING MACHINES.

1,212,989.   Specification of Letters Patent.   Patented Jan. 16, 1917.

Application filed September 25, 1914.   Serial No. 863,439.

*To all whom it may concern:*

Be it known that I, LEWIS C. MYERS, a citizen of the United States of America, residing in the borough of Brooklyn, county of Kings, and State of New York, have invented a certain new and useful Improvement in Carriage-Shift Stops for Type-Writing Machines, of which the following is a specification.

This invention relates to that class of carriage shifting devices of typewriting machines which are vertically moved to produce upper and lower case printing. Such devices are ordinarily provided with adjustable stops for the proper alinement of the two styles of type which in operation are somewhat noisy. The device of this invention is for the purpose of eliminating this noise as much as possible, and as designed is particularly applicable to the Royal typewriting machine. It comprises a rod extending downwardly from the carriage shift frame or the lower guide-way preferably having an offset or return bend mediate its ends. The lower part of the rod passes freely through a lug projecting from the main frame of the machine and is provided with nuts and check nuts to contact with the upper and under sides of said lug. Each side of the machine will be provided with a rod thus formed with the offset or return bend connecting its two members, which are preferably in line, leaving a gap at its central part so that the compression and tensional strains due to the shocks of sudden stoppage of the carriage in its two positions are not opposed by a straight line metallic connection, the noise of contact of the stops being thereby greatly reduced. Of course it will be understood that the rod will be sufficiently rigid to avoid adverse vibrations of the carriage as it is stopped in its two positions. To further reduce the noise of operation it is proposed to place on the rod, between the adjusting nuts and the lug, washers of non-elastic sound deadening material, such as copper.

In the accompanying drawings forming part of this specification: Figure 1 is a side elevation of parts of a typewriting machine of the Royal construction showing the improved carriage shift stop applied thereto; and Fig. 2, a front elevation of one of the carriage shift stops.

3 designates the rotary platen having bearings in the carriage, the two sides 4 of which are connected together by a rod 5 guided in bearing rollers 6 supported on an extension 7 of the carriage shift frame 8. The lower part of the carriage is supported by balls held in the lower rail 9 connected to the shift frame, said frame being, at each end, guided and controlled by a lever plate 10 pivoted at 11 thereto. A rocking rod 29 carries the lever plate 10 and has bearings in the main frame of the machine.

12 is the parallel link pivoted to the lower part of the shift frame and to the main frame, a part of one side of which is shown at 13, Fig. 2. The shift lever 14 by its right angle member 15 is connected to the lever plate 10 by a link 16, there being lost motion in the connecting joint as shown at 17. Another rod 18 connects the member 15 of lever 14 to a locking dog or pawl 19, which engages with a projection 20 on the shift frame when it is in lower position, the arrangement being such that the dog 19 is moved away from projection 20 before the upward movement of the carriage commences.

Extending downwardly from a leg at each side of the shift frame is a supporting and controlling rod 21 formed with an offset or return bend 22 at its central part, as shown at Fig. 1. Its lower end passes through an opening in a lug 23 extending inwardly from the lower part of the side 13 of the main frame. This part of the rod is screw threaded to receive the supporting and stop nuts 24 and 25 respectively and their check nuts 26 and 27. Sound deadening washers 28 are shown on the rod 21 against the nuts 24 and 25 to contact with the lug 23. These washers may be made of copper or any suitable non-elastic metal or material adapted to eliminate or reduce the noise due to the sudden contacting of the stops and lug in operating this part of the machine.

The material of the rod 21 will, when provided with the offset 22 which forms a gap mediate its connected and stopping points, be of such size and character as to resist without undue vibrations the sudden compression and tensional strains to which it will be subjected.

The adjusting nuts provide a ready means for accurately setting the carriage for upper and lower case printing.

It is evident this carriage shift stop is adapted to be applied to vertically movable carriages for case printing other than the Royal machine here illustrated, and that the two vertical parts of it may be arranged in other than a right line, as shown, when it is formed with the central bend.

I claim:

1. In a typewriter, a shiftable carriage supporting frame, a rod secured to said frame and having a shock absorbing offset mediate its ends, means for shifting the carriage shift frame and means applied to the rod for stopping the carriage in its two set positions.

2. In a typewriter, a shiftable carriage supporting frame, a rod secured to said frame and having a shock absorbing offset mediate its ends connected at its upper end to the carriage shift frame, means for shifting the carriage shift frame and means applied to the lower part of the rod for stopping the carriage in its two set positions.

3. In a typewriter, a shiftable carriage supporting frame, a rod secured to said frame and having a shock absorbing offset mediate its ends connected at its upper end to the carriage shift frame, means for shifting the carriage, a lug on the main frame of the machine through which the lower part of the rod passes, and means on the lower part of the rod for adjustably stopping it in two directions.

4. In a typewriter, a shiftable carriage supporting frame, a rod secured to said frame and having a shock absorbing offset mediate its ends connected at its upper end to the carriage shift frame, means for shifting the carriage shift frame, a lug on the main frame of the machine through which the lower part of the rod passes and adjustable nuts on the rod above and below the lug.

5. In a typewriter, a shiftable carriage supporting frame, a rod secured to said frame and having a shock absorbing offset mediate its ends connected at its upper end to the carriage shift frame, means for shifting the carriage shift frame, a lug on the main frame of the machine through which the lower part of the rod passes, adjustable nuts on the rod above and below the lug and sound deadening washers on the rod between the nuts and the lug.

6. In a typewriter, the combination of a shiftable carriage-supporting frame, a vertically arranged rod secured to said frame and having a laterally projecting shock absorbing bend or offset intermediate its ends, and stops associated with the lower part of the rod for limiting its movements.

In testimony whereof, I have hereunto subscribed my name.

LEWIS C. MYERS.

Witnesses:
 GEORGE F. HANDLEY,
 WILLIAM LESLIE.

Correction in Letters Patent No. 1,212,989.

It is hereby certified that in Letters Patent No. 1,212,989, granted January 16, 1917, upon the application of Lewis C. Myers, of Brooklyn, New York, for an improvement in "Carriage-Shift Stops for Type-Writing Machines," an error appears in the printed specification requiring correction as follows: Page 2, line 28, claim 3, after the word "carriage" insert the words *shift frame;* and that the said Letters Patent should be read with this correction therein that the same may conform to the record of the case in the Patent Office.

Signed and sealed this 13th day of February, A. D., 1917.

[SEAL.]

R. F. WHITEHEAD,
*Acting Commissioner of Patents.*

Cl. 197—81.